Jan. 13, 1942.   L. S. POWELL   2,269,734
DIFFERENTIAL
Filed Sept. 18, 1939   2 Sheets-Sheet 2
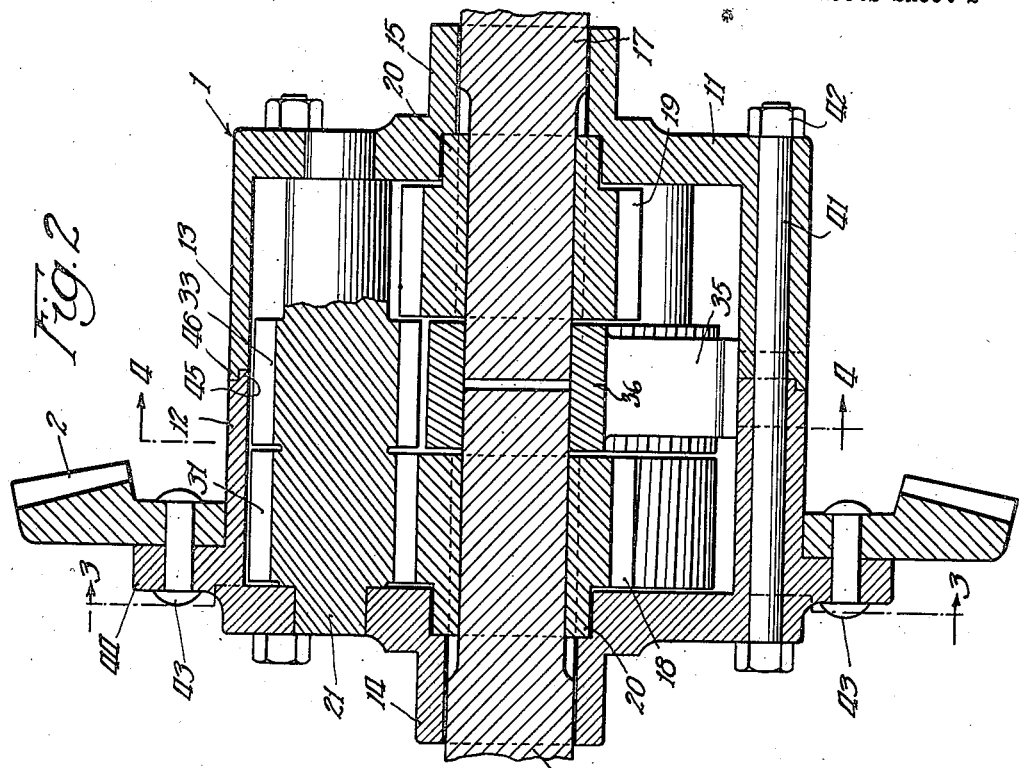
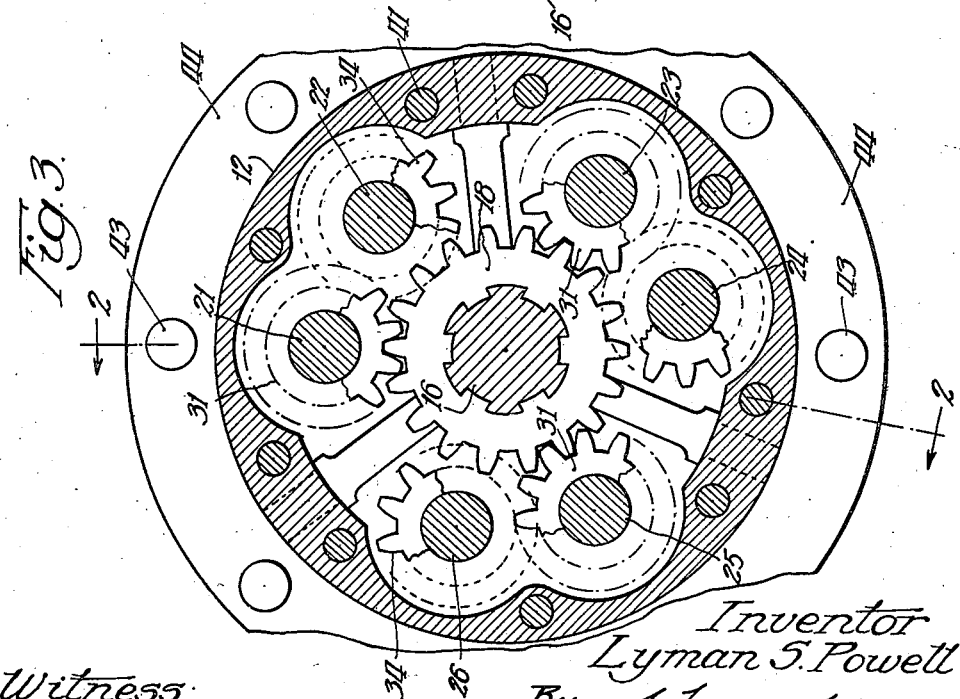
Witness:
V. Siljander
Inventor
Lyman S. Powell
By Stice & Stice Attys.

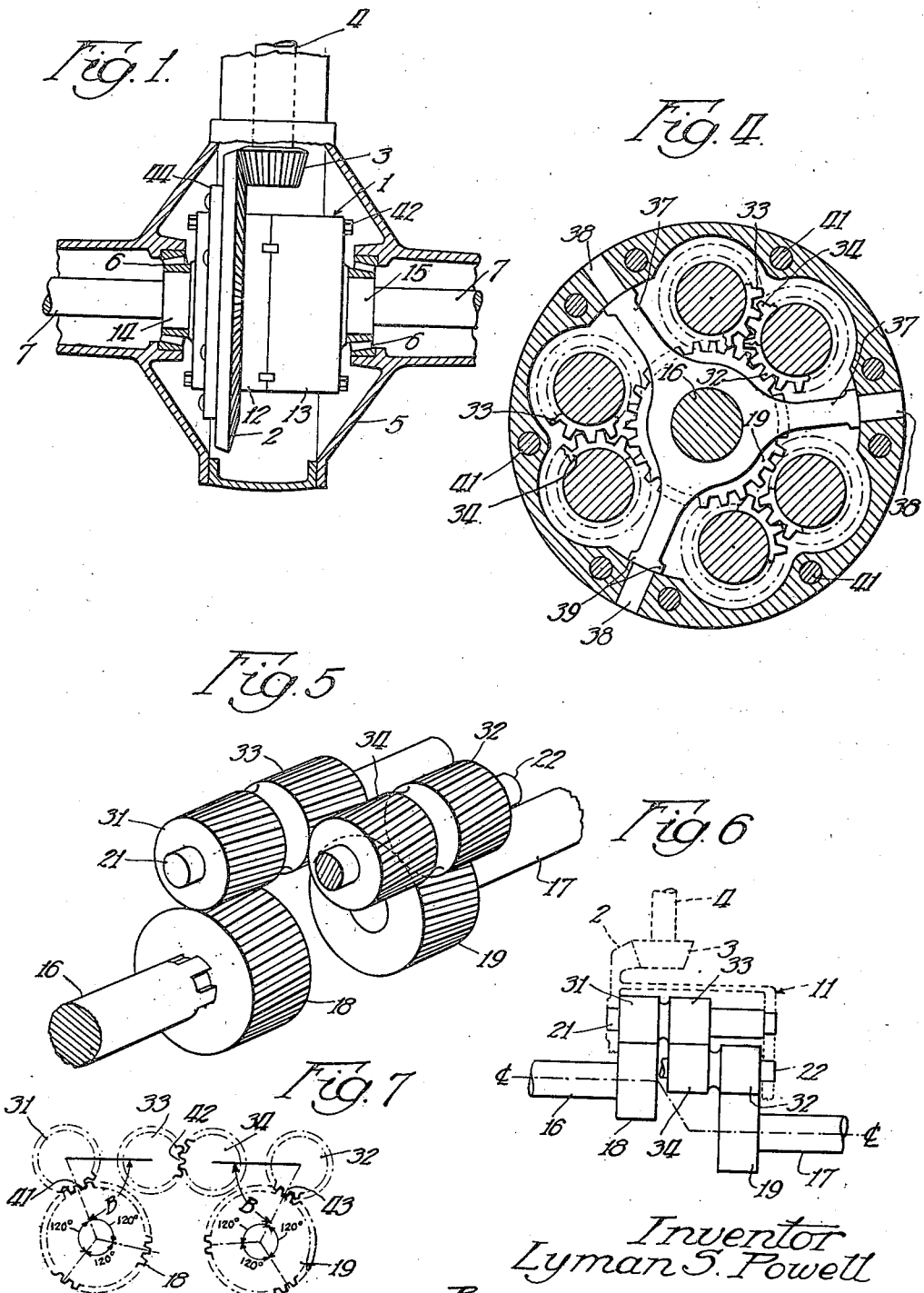

Patented Jan. 13, 1942

2,269,734

UNITED STATES PATENT OFFICE 2,269,734

DIFFERENTIAL

Lyman S. Powell, Chicago, Ill.

Application September 18, 1939, Serial No. 295,402

7 Claims. (Cl. 74—312)

The invention relates generally to differential mechanisms, and more particularly to a spur gear type of differential.

I am aware that spur gear differentials have been constructed at various times, but due to one fault or another, they never were successful and were soon discontinued, the bevel gear type of differential being most commonly employed in automobiles.

Consequently, the invention has among its most important objects the production of a spur gear type of differential which is relatively simple in construction, and which is very efficient for the purposes intended.

Another important object of the invention is the construction of such a differential in which the gears are assembled in a balanced relation throughout the device, thereby eliminating any backlash or uneven wear.

Another object of the invention is the production of such a differential in which the axles are rigidly supported, thereby preventing excess vibration thereof, and at the same time, insuring proper engagement of all gears.

A further object of the invention is the production of novel means for insuring accurate alignment of the parts.

Another object of the invention is the construction of a differential wherein tooth stresses of the gear are similar at any one instant throughout the gear train.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings wherein like reference characters indicate like or corresponding parts:

Fig. 1 is a sectional view through the differential housing showing a plan view of the differential unit;

Fig. 2 is a sectional view taken substantially on the line 2—2 of Fig. 3;

Fig. 3 is a sectional view taken substantially on the line 3—3 of Fig. 2;

Fig. 4 is a sectional view taken substantially on the line 4—4 of Fig. 2;

Fig. 5 is a view in perspective showing the driven gears and one set of driving pinions;

Fig. 6 is a somewhat diagrammatic view of the gears and pinions shown in Fig. 5; and Fig. 7 is a diagrammatic plan view of the gear train comprising the gears 18, 31, 32, 33, 34, and 19, showing method of construction and assembly.

Referring now to Fig. 1 of the drawings, I generally represents the differential unit which is the subject matter of the present invention, the unit being driven by the usual ring gear 2 which in turn is driven by a pinion 3 from the drive shaft 4. The unit I is rotatably carried by the housing 5 in suitable bearings 6, the two axles or driven shafts 7 extending from the unit, similar to the usual type of differential. As shown in Figs. 2, 3, and 4, the unit I comprises a housing II in the form of two halves 12 and 13, respectively, the housing being divided transversely substantially at the longitudinal center of the unit. Each half of the housing carries a hub, the half 12 carrying the hub 14 and the half 13 carrying the hub 15, respectively. Passing through the hubs 14 and 15 are the car axles or other driven shafts 16 and 17, respectively. Keyed or otherwise secured to the shaft 16 is a spur gear 18 and similarly secured to the shaft 17 is an identical spur gear 19. Each of the spur gears 18 and 19 is provided with an integrally formed boss 20 positioned in counterbores in the respective halves of the housing. These bosses merely prevent the spur gears 18 or 19 from dropping out of alignment with the axis of the shafts when the latter are withdrawn from the gear and the housing. By providing the bosses, the shafts 16 or 17 may be readily removed from the differential unit and replaced without disassembling the latter.

Journaled at opposite ends in the respective halves of the housing are three pairs of spindles 21 and 22, 23 and 24, 25 and 26. Preferably integrally formed on the respective spindles are pinions, all the pinions being of similar shape and size, having the same number of teeth, and preferably cut in a single operation to insure exact alignment. Shown in diagrammatic form in Fig. 6 are the single pair of spindles 21 and 22 and shafts 16 and 17 carrying the spur gears 18 and 19, respectively, the axes of the spindles and shafts being rotated into a common plane to more clearly show the assembly. As shown, the spur 18 meshes with a pinion 31 carried by the spindle 21. A corresponding pinion 32 carried on the shaft 22 meshes with the spur 19. Carried on the spindles 21 and 22 are pinions 33 and 34, respectively, meshing with one another and as above mentioned are identical with the pinions 31 and 32. Thus, it will be seen that the two driven shafts 16 and 17 are operatively connected with one another through the spur 18 meshing with the pinion 31 which in turn through the spindle 21 will drive the pinion 33 meshing with the pinion 34, the latter in turn through the spindle 22 driving the pinion 32 which meshes with the other spur 19. Both the spindles 21 and 22, as previously mentioned, are journaled in the housing 11 to which the ring gear 2 is secured, the pinion 3 engaging the ring gear to rotate it and the housing, carrying with it the spindles journaled therein.

Thus, it will be seen that when the torque upon the axles 16 and 17 is substantially the same, power will be transmitted from the driving shaft 4 through the pinion 3 and ring gear 2 to rotate the housing 11. As both axles 16 and 17 tend to rotate the respective pinions 31, 33 and 32, 34 in the same direction, the housing 11 is in effect locked to the respective axles and the housing and the axles rotate as one. However, when the torque on one axle becomes greater as, for example, when turning a corner, assuming that the device is in use in an automobile, the axles 16 and 17 are free to rotate in opposite directions relative one another to equalize the torque between them. The spindles 23 and 25 carry pinions identical with and positioned similarly to the pinions 31 and 33, the spindles 24 and 26 carrying pinions identical with the pinions 32 and 34, all of the spindles being of identical shape and size, the respective spindles of any one pair merely being reversed with respect to one another.

The locking action above referred to takes place as soon as the differential housing is rotated by the ring gear as the two pinions 33 and 34 tend to rotate in the same direction and therefore lock.

The theory and principles of operation just described are similar to that of the spur gear type of differentials that have been known over a period of years, but which due to their mechanical construction failed to completely and perfectly apply those principles and consequently, were unsuccessful. Obviously, the application of these principles is limited to the mechanical construction of the device and because of the latter may or may not incorporate the principles involved. Consequently, the prior devices failed to provide a construction which allowed complete operation of these principles as the construction was such that vibration, unequal tooth stresses, etc., soon destroyed parts of the differential and rendered the same inoperative. For these reasons, it will be apparent from the present description that applicant's device provides a construction which eliminates the objections to prior devices, thus completely utilizing the principles set forth above and thereby succeeds where past devices failed.

It is highly desirable in gear trains such as this that there be substantially no vibratory movement of the driven shafts or the spindles. To insure this condition, the ends of the driven shafts 16 and 17 are journaled in a spider 35 which is positioned in and carried by the housing at the juncture of the halves 12 and 13. As shown in Figs. 2 and 4, the spider 35 comprises a hub 36 which journals the ends of the shafts 16 and 17. Extending radially from the hub between the respective pairs of spindles are supporting legs 37. The ends 38 of the legs 37 are of rectangular cross section and are anchored in recesses in the housing 11, each recess being jointly cut from both halves of the housing, the rectangular ends 38 being of a size to firmly seat in the recesses. Each leg 37 is formed with shoulders 39 seating on the inner face of the housing, thereby insuring the spider 35 being rigidly carried by the housing. The spider also performs another function. As the recesses in the housing, adapted to receive the rectangular ends 38 of the spider, are cut in both halves 12 and 13 of the housing, the rectangular legs of the spider act as keys to position the halves of the housing in the exact correct position. In this way, the spindles may be accurately and efficiently aligned with a minimum of effort and time. Bolts 41 passing longitudinally through the halves of the housing and nuts 42 securely fasten and maintain the halves 12 and 13 of the housing in assembled relation. The ring gear 2 may be formed integrally with the housing or if desired, formed separately and secured thereto by any suitable means, as, for example as shown in Fig. 2, by rivets 43 passing through the ring gear and a peripheral flange 44 integrally formed with the half 12 of the housing. The two halves 12 and 13 of the housing are provided with concentric shoulders 45 and 46, thereby insuring the same being firmly and rigidly seated upon one another, eliminating any possibility of radial movement between the same.

One of the most important features of the present invention is the design of the spur gears and pinions with reference to the size and number of teeth as well as the relative pitch diameters of the various gears, these factors being related to one another. The number of teeth on the spur gears will depend upon the number of pairs of spindles and their associated pinions, the number of teeth on the spur gears being divisible by the number of pairs of spindles, as, for example, the present differential illustrated has three pairs of spindles so the number of teeth on each of the spur gears 18 and 19 therefore is divisible by three. The corresponding spindles of each pair are positioned 120° from one another or one-third of the circumference of the pitch circle of the spur gear. Consequently, by providing the spur with a number of teeth divisible by three in this case, the teeth on the spur will always be similarly positioned relative the respective engaging pinions on the shafts 21, 23, and 25. That is, when the center of one tooth on the spur is directly on the line connecting the centers of the spur 18 and the spindle 21, teeth on the spur will have their centers similarly positioned on the corresponding lines connecting the center of the spur and the centers of the shafts 23 and 25, respectively. Consequently, tooth stresses between the spur and its engaging pinions at any one instant will be similar for any of the gears. Similarly, if four pairs of spindles were used, the number of teeth on the spur should be divisible by four.

To more clearly show the relationship between the teeth of the various gears, a diagrammatic assembly of the gear train is illustrated in Fig. 7, all of the gears being brought into a common plane. It will be apparent that the pinions 31 and 33 formed integrally with one another on the shaft 21 and having their teeth simultaneously formed in a single operation function substantially as a single gear so that for all practical purposes, the pinions 31 and 33, as shown in Fig. 7, may be considered as a single gear. Similarly, the pinions 32 and 34 may be considered as a single gear.

It will be noted that the tooth 41 on the pinion 18 meshes with the space on the pinion 31. In the same manner, the tooth 42 on the pinion 33 meshes with the space on the pinion 34. Similarly, the tooth 43 on the pinion 32 meshes with a space on the spur 19. The result of this tooth division is that the relationship of the teeth transmitting the force from one gear to another and the teeth receiving the force is exactly the same in every case. The tooth 41 transmits energy from the spur 18 to the pinion 31. The tooth 42 of the pinion 31, in exactly the same relationship transmits force from the pinion to the other pinion 34, and the pinion 32 in turn through the tooth 43 drives the spur 19. It will be noted that in this construction, the internal stresses in the contacting teeth between any of the respective gears are exactly the same. Obviously, on meshing gears the tooth stresses between contacting teeth will vary from one side of the pitch circle to the same amount on the opposite side of the pitch circle. This must necessarily be because the point of contact between the teeth is not fixed on the pitch circles. Of course, however, in tooth construction, the pitch point which is the point of intersection of the normals of the tooth outlines of meshing teeth on the line of centers must be a fixed point and is in effect the point of tangency of the pitch circles. If this point were not fixed, constant angular velocity could not be obtained. It will be apparent, therefore, that in the present construction, tooth stresses will be uniformly balanced throughout the gear train and there will be no tendency during operation for the stresses to alternate back and forth between the various gears as would otherwise be the case.

It will be apparent that to achieve this result of balanced tooth stress throughout the gear train, a definite relationship exists between the size and number of teeth on the respective gears.

Referring to Fig. 7 of the drawings, it will be seen that the pinion 31 must have a space thereon engaging the tooth 41 at the same time that tooth 42 of pinion 33 is similarly engaging the space on the pinion 34. In a like manner, the pinion 32 must have a tooth 43 engaging a space on the spur 19 at exactly the same time that the tooth 42 of the pinion 33 is engaging the space on the pinion 34. As all pinions are the same size, we can think of pinions 31 and 33 as a single gear (31—33) and the pinions 32 and 34 as a single gear (32—34). Therefore, on both pinions (31—33) and (32—34), the angle B must contain $(x+\frac{1}{2})$ number of teeth where $x$ may be any number, the half tooth being necessary to position a space adjacent the tooth 41 on the spur 18 and the tooth 42 adjacent the space on the pinion (32—34). Likewise, as previously mentioned, the number of teeth on both the spur 18 and the spur 19 should be divisible by the number of pairs of spindles and associated gears connecting the spurs 18 and 19, in this case, 3. Thus, the teeth on a pair of pinions will be similarly positioned relative each other and the spurs at any given instant during rotation thereof. In other words, the tooth relationship at any instant between any driving gear and its driven gear will be identical with that between any other driving gear and its driven gear. By constructing the differential unit in this manner, all of the gears are in complete balance so that stresses in contacting teeth will be alike throughout the gears of the train.

It will be noted from the above description that I have provided a differential unit embodying an improved construction whereby the various parts may be accurately aligned and assembled, the ends of the axles or driven shafts being firmly supported, and wherein tooth stresses are balanced throughout the gear train to provide an assembly which is very durable and efficient for the purposes intended, and in which wear will be uniform throughout.

Having thus described my invention, it will be obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a differential gear device, a pair of opposed shafts having a common axis, a spur gear carried by each of said shafts adjacent the opposed ends thereof, a housing for said gears, a pair of spindles journaled in the housing and having their axes parallel to the axis of said shafts, pinions on each spindle engageable with each other, a pinion on each spindle being engageable with a respective spur gear, the driving teeth of said spurs and pinions being simultaneously on the respective lines connecting the centers of each meshing pair of gears.

2. In a differential gear device, a pair of opposed shafts having a common axis, a gear carried by each of said shafts adjacent the opposed ends thereof, a housing for said gears, a plurality of pairs of spindles journaled in the housing and having their axes parallel to the axis of said shafts, said pairs of spindles being radially positioned around the axis of said shafts, pinions on the spindles of each pair engageable with each other, a pinion on each spindle of a pair being engageable with one of the gears on said shafts, the ratio of said pinions to the respective spur gears being not less than the ratio of 1 to the number of pairs of pinions.

3. In a differential gear device, a pair of opposed shafts having a common axis, a spur gear carried by each of said shafts adjacent the opposed ends thereof, a housing for said gears, a plurality of pairs of spindles journaled in the housing and having their axes parallel to the axis of said shafts, pinions on the spindles of each pair engageable with each other, a pinion on each spindle of a pair being engageable with a respective spur gear, said spurs having teeth the number of which is divisible by the number of pairs of spindles, said pairs of spindles being radially positioned equidistant around the axis of said shafts, the driving teeth of said spurs and pinions being simultaneously on the respective lines connecting the centers of each meshing pair of gears.

4. In a differential gear device, a pair of opposed shafts having a common axis, a spur gear carried by each of said shafts adjacent the opposed ends thereof, a housing for said gears, said housing being separable intermediate the longitudinal ends thereof, a plurality of pairs of spindles each having their ends journaled in the respective portions of said housing and having their axes parallel to the axis of said shafts, pinions on the spindles of each pair engageable with each other, a pinion on each spindle of a pair being engageable with a respective spur gear, said spurs having teeth the number of which is divisible by the number of pairs of spindles, said pairs of spindles being radially positioned equidistant around the axis of said shafts, the driving teeth of said spurs and pinions being simultaneously on the respective lines connecting the centers of each meshing pair of gears, and a bearing member positioned in said housing and engageable with the portions of the housing substantially at their juncture to align the latter in correct relation to each other, the ends of said shafts being journaled in said member.

5. In a differential gear device, a pair of opposed shafts having a common axis, a gear carried between each of said shafts adjacent the opposed ends thereof, a housing for said gears, a plurality of pairs of spindles journaled in said housing and regularly positioned around the axis of said shafts, pinions on the spindles of each pair engageable with each other, a pinion on each spindle of a pair being engageable with a respective gear on said shafts, the ratio of said pinions to the respective gears being not less than the ratio of 1 to the number of pairs of pinions.

6. A differential gear device, a pair of opposed shafts having a common axis, a spur gear carried by each of said shafts adjacent the opposed ends thereof, a housing for said gears, a plurality of pairs of spindles journaled in the housing and having their axes parallel to the axis of said shafts, pinions on the spindles of each pair engageable with each other, a pinion on each spindle of a pair being engageable with a respective spur gear, the ratio of said pinions to their respective spur gears being not less than the ratio of 1 to the number of pairs of pinions, said spurs having teeth the number of which is divisible by the number of pairs of spindles, said pairs of spindles being radially positioned around the axis of said shafts, the driving teeth of said spurs and pinions being simultaneously on the respective lines connecting the centers of each meshing pair of gears.

7. A differential gear device, a pair of opposed shafts having a common axis, a spur gear carried by each of said shafts adjacent the opposed ends thereof, a housing for said gears, 3 pairs of spindles journaled in the housing and having their axes parallel to the axis of said shafts, pinions on the spindles of each pair engageable with each other, a pinion on each spindle of a pair being engageable with a respective spur gear, the ratio of said pinions to their respective spur gears being not less than the ratio of 1 to 3, said spurs having teeth the number of which is divisible by the number of pairs of spindles, said pairs of spindles being radially positioned around the axis of said shafts, the driving teeth of said spurs and pinions being simultaneously on the respective lines connecting the centers of each meshing pair of gears.

LYMAN S. POWELL.